United States Patent
Degel et al.

(10) Patent No.: US 10,065,338 B2
(45) Date of Patent: Sep. 4, 2018

(54) METHOD AND DEVICE FOR ADJUSTING A KNIFE ASSEMBLY OF A KNIFE RING TO A PREDETERMINED KNIFE PROJECTION

(71) Applicant: PALLMANN MASCHINENFABRIK GmbH & Co. KG, Zweibruecken (DE)

(72) Inventors: Volker Degel, Blieskastel-Niederwuerzbach (DE); Norbert Friedrich, Homburg-Einoed (DE)

(73) Assignee: Pallmann Maschinenfabrik GmbH & Co. KG, Zweibruecken (DE)

( * ) Notice: Subject to any disclaimer, the term of this patent is extended or adjusted under 35 U.S.C. 154(b) by 307 days.

(21) Appl. No.: 14/947,208

(22) Filed: Nov. 20, 2015

(65) Prior Publication Data

US 2016/0144532 A1 May 26, 2016

(30) Foreign Application Priority Data

Nov. 20, 2014 (DE) ........................ 10 2014 116 972

(51) Int. Cl.
*B27L 11/00* (2006.01)
*B02C 18/18* (2006.01)
*B23Q 17/22* (2006.01)

(52) U.S. Cl.
CPC ............ *B27L 11/005* (2013.01); *B02C 18/18* (2013.01); *B02C 18/186* (2013.01); *B23Q 17/2225* (2013.01)

(58) Field of Classification Search
CPC ..... B27L 11/005; B02C 18/18; B02C 18/182; B02C 18/184; B02C 18/186; B02C 18/145; B02C 18/146; B02C 18/06; B02C 18/144; B02C 18/28
See application file for complete search history.

(56) References Cited

U.S. PATENT DOCUMENTS

| 9,393,713 | B2 * | 7/2016 | Honkanen | B02C 18/18 |
| 2007/0158478 | A1 * | 7/2007 | Stager | B27L 11/005 241/91 |
| 2009/0200411 | A1 * | 8/2009 | Stager | B27L 11/005 241/296 |

FOREIGN PATENT DOCUMENTS

| DE | 27 55 000 A1 | 6/1979 |
| DE | 101 25 922 A1 | 11/2002 |

* cited by examiner

Primary Examiner — Matthew G Katcoff
(74) Attorney, Agent, or Firm — Muncy, Geissler, Olds & Lowe, P.C.

(57) ABSTRACT

A method and a device for adjusting a knife assembly of a knife ring to a predetermined knife projection, wherein the knife assembly is designed to be arranged in the knife ring at a chip angle φ, relative to the inside of the knife ring. The knife assembly is formed by a knife holding plate and a chipping knife which are positively connected with one another in a predetermined, relative target position. A knife assembly to be adjusted is provided, wherein the knife holding plate and the chipping knife are displaceable relative to one another. The knife holding plate is displaced in its plane, transversely to its direction of longitudinal extension towards its rear edge, against a first stop. The chipping knife is displaced in its plane against the stop surface of a second stop, until the predetermined knife projection has been reached.

15 Claims, 7 Drawing Sheets

METHOD AND DEVICE FOR ADJUSTING A KNIFE ASSEMBLY OF A KNIFE RING TO A PREDETERMINED KNIFE PROJECTION

This nonprovisional application claims priority under 35 U.S.C. § 119(a) to German Patent Application No. 10 2014 116 972.7, which was filed in Germany on Nov. 20, 2014, and which is herein incorporated by reference.

BACKGROUND OF THE INVENTION

Field of the Invention

The invention relates to a method for adjusting a knife assembly of a knife ring to a predetermined knife projection as well as a device suitable for performing the method.

Description of the Background Art

Knife ring chippers as known, for example, from DE 101 25 922 A1, have a rotating knife ring which is used as a central comminution unit and moved against the stationary feed material during the comminution process. The knife ring has a carrier disc which is positioned coaxially to the rotational axis, and an annular disc axially spaced thereto, which are both connected via their periphery to axially parallel knife carriers. Each knife carrier holds a knife assembly which is comprised of a knife holding plate and a chipping knife, and which adjoins a defined stop of the knife carrier with the rear edge of the knife holding plate, while the blade of the chipping knife protrudes into the cutting chamber with a predetermined knife projection. The blades of all chipping knives hereby sit on a shared blade cutting circle, each forming a passage gap with the projecting knife carrier. In order to produce chippings of the same shape and in particular, the same chip thickness, it is necessary that the passage gap features the same geometry at each tool pairing. It is thus required that the blades of all chipping knives have the same knife projection relative to the inside of the knife ring.

Operating knife ring chippers of the type described implies that the chipping knife is subject to constant wear and tear, which requires a reduction in knife projection. For this reason, the knife assemblies used are replaced with new or re-sharpened ones several times a day. So that the blades of the new knife assemblies also have a uniform knife projection, the width of a knife assembly can be adjusted to the required, targeted dimension, transversely to its direction of longitudinal extension, i.e. from the rear edge of the knife holding plate to the blade of the chipping knife, in a gage outside the knife ring. For this purpose, known gages possess a mounting surface for a knife assembly with a rear stop and a front stop. During insertion, the knife holding plate is placed against the rear stop, and the chipping knife with its blade against the front stop. In this relative position to one another, the knife holding plate and the chipping knife are then screwed together.

This way, satisfactory results in respect of the knife projection can be obtained. However, different thicknesses of the knife assemblies due to dimensional tolerances during production and/or mounting, are not taken into account. These have a negative effect on the exact compliance of the knife projection during installation in a knife ring due to the sloped position of the knife assembly relative to the blade cutting circle or the inner circumference of the knife ring.

SUMMARY OF THE INVENTION

It is therefore an object of the invention to be able to accurately adjust the knife assembly of a knife ring to the required knife projection while taking into account production and mounting-related dimensional tolerances.

An embodiment of the invention is based on the idea of reproducing the geometrical conditions in the knife ring as needed when configuring a knife assembly to the desired knife projection. Of importance is the relative position of the plane in which the blade of the chipping knife is moved, and the relative position of the stop surface against which the blade is moved, which are both arranged relative to one another at a chip angle $\phi$.

First, this has the advantage that disturbances such as dimensional deviations in the thicknesses of the knife holding plate and/or chipping knife, or mounting tolerances in the knife assemblies, no longer influence the adjustment of the knife projection. Thanks to the invention, the knife projection in all knife assemblies of a knife ring can be adjusted smoothly, quickly and accurately to the required dimension, with the result that the dimensional accuracy of the produced chips is guaranteed within strict boundaries, allowing for high quality standards in the end product.

In an exemplary embodiment of the invention, the stop surface can be designed to be stationary, wherein the blade of the chipping knife can be chipped at the fixed stop surface, whereby the knife holding plate with its rear longitudinal side adjoins a further, fixed stop. This embodiment of the invention is characterized by its simplicity in construction and its adjustment process.

Also, an embodiment is provided in which the stop surface is designed to be linearly displaceable, and yields under the influence of pressure. The displacement direction can run perpendicular to the measuring area, that is, the displacement direction forms an angle of $90°+\phi$ with the plane in which the blade of the chipping knife is being moved. By means of a measurement device, the current knife projection can then be directly derived and displayed using the displacement path, which increases adjustment accuracy and enables an automatization of the process with the aid of suitable control technology.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
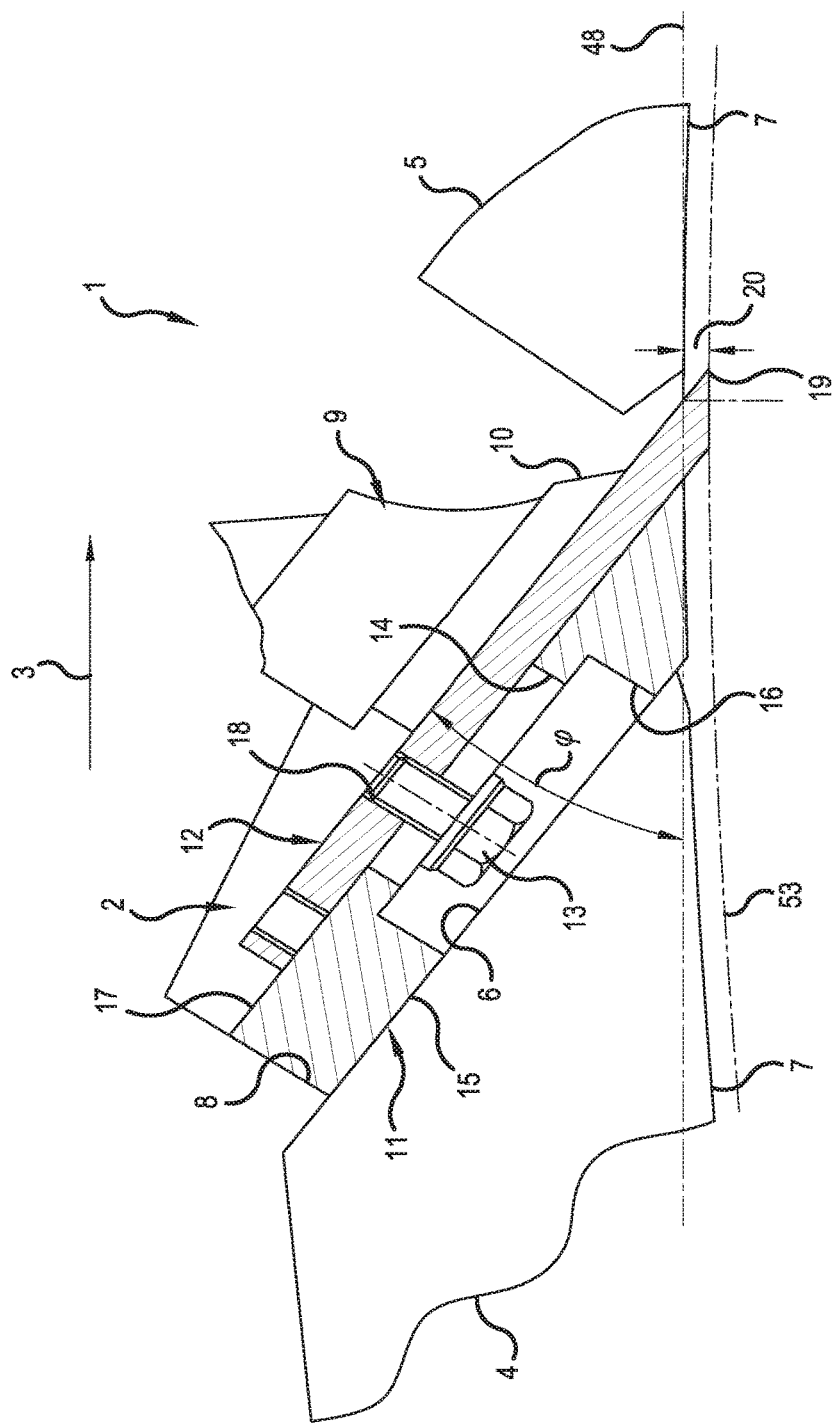
FIG. 1 is a partial section through a knife ring of a knife ring chipper in the area of a knife assembly.
Figure 2:
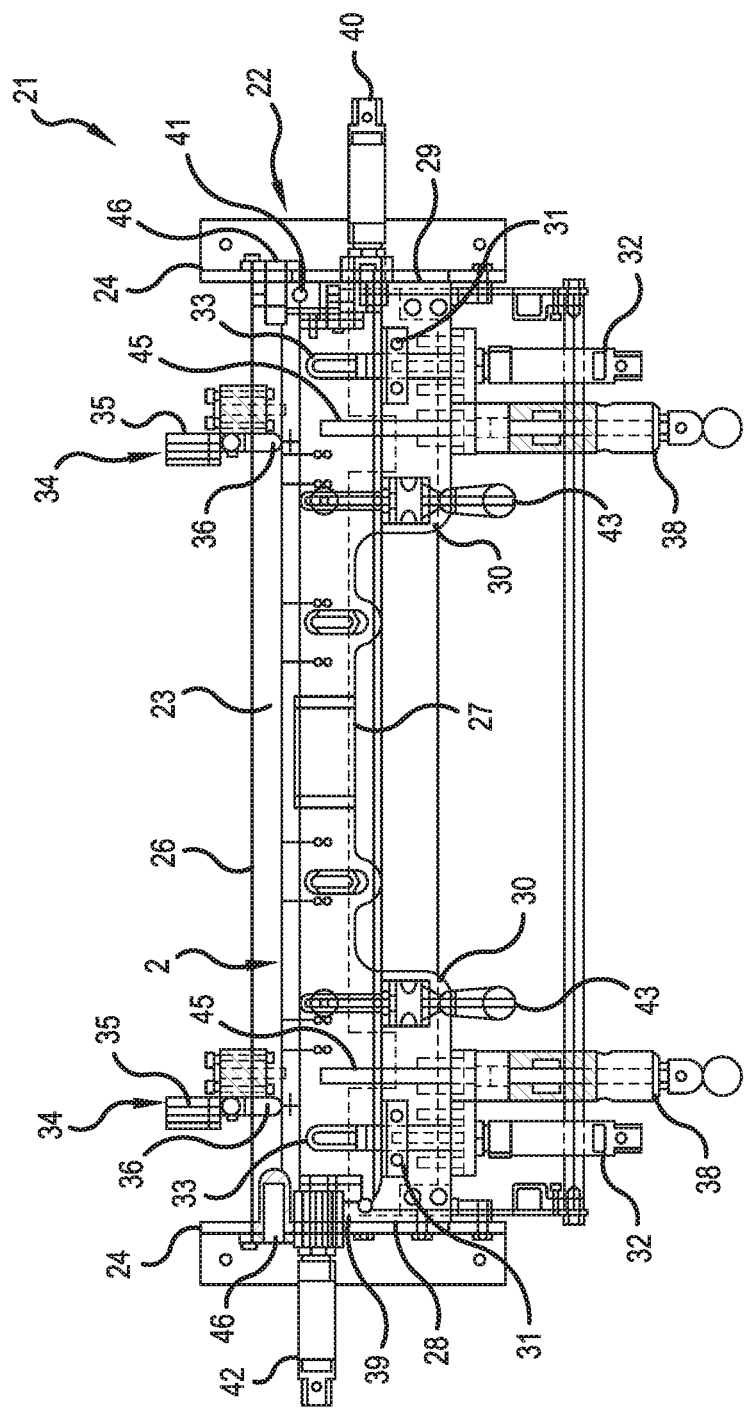
FIG. 2 is a view from above of a device according to the invention for adjusting the knife projection of a knife assembly.
Figure 3:
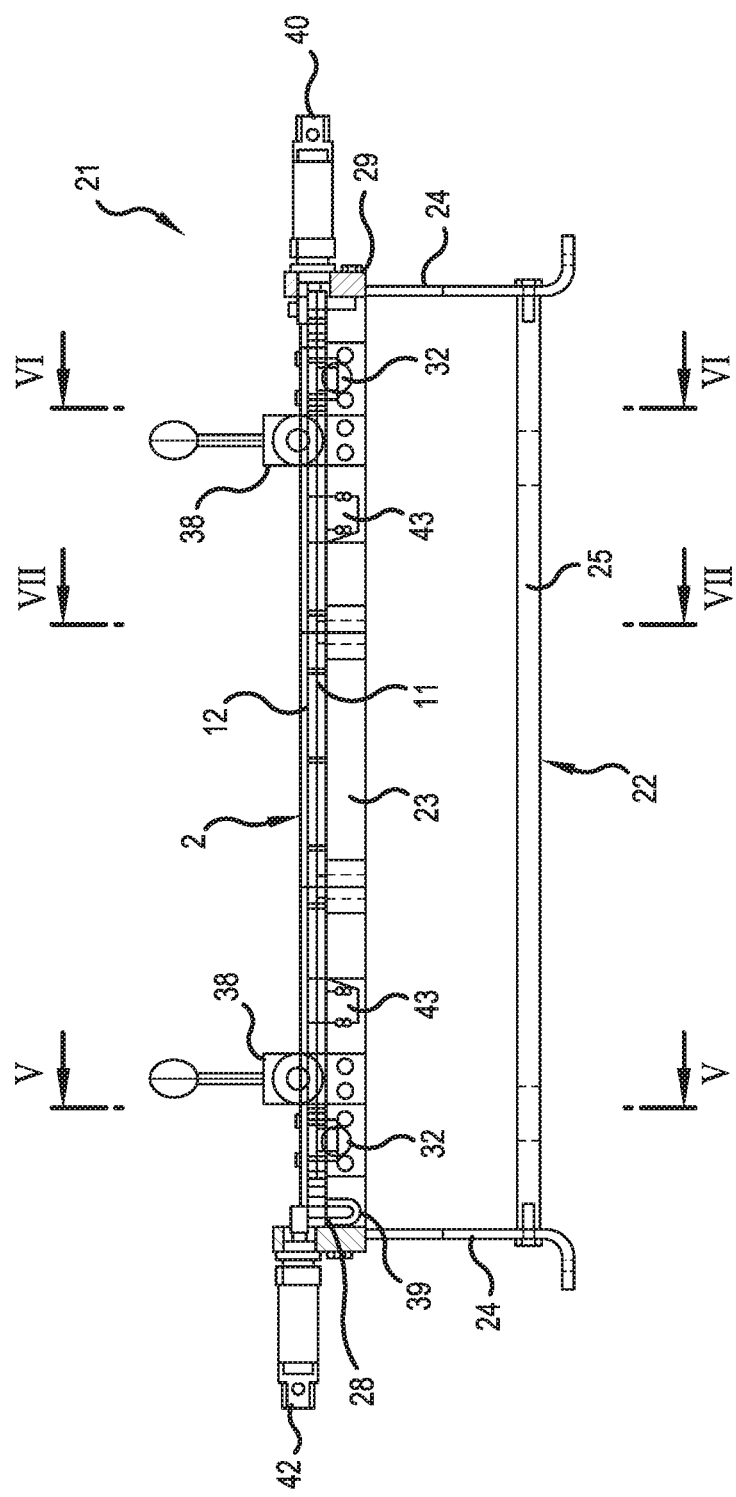
FIG. 3 is a longitudinal view of the device, shown in FIG. 2.

In FIG. 1, one can see a partial cross-section of a knife ring 1 of a knife ring chipper in the area of the knife assembly 2 mount. The rotational direction of the knife ring 1 while the knife ring chipper is being operated, is marked as 3. One can see the front area of a first knife carrier 4 tapered in rotational direction 3, and the rear area of an equally tapered, second knife carrier 5 which projects at a predetermined peripheral distance. The undersides of all knife carriers 4, 5 form the inside 7 of the knife ring 1. Each knife carrier 4, 5 has a mounting surface 6 on which the knife assembly 2 rests in the chip angle $\phi$, opposite a tangent 48, at the inside 7 of the knife ring 1, and an adjustable stop 8 at the end of the mounting surface 6 at which a knife assembly 2 is adjusted in a neutral position during insertion into the knife ring 1. The stops 8 of all knife carriers 4, 5 of a knife ring 1 are thereby adjusted to a uniform radial distance to the rotational axis, that is, they sit concentrically on a shared cutting circle 53. The chip angle $\phi$ lies in a range between 20° and 40° and can be 35°. A pressure element 9 acts on the knife assembly 2 via a clamping bar 10, thereby clamping the assembly to its fixing in the knife ring 1 relative to the mounting surface 6.

The knife assembly 2 has a knife holding plate 11 and a chipping knife 12 which are fixedly connected with one another via screws 13. For this purpose, the knife holding plate 11 has numerous laterally spaced slots 14 which extend transversely to the longitudinal direction of the knife holding plate 11. Each slot 14 is enclosed by a recess 16 originating at the upper side 15 of the knife holding plate 11 which serves to hold the head of the bolt 13. The slots 14 extend from the bottom of the recess 16 to the underside 17 of the knife holding plate 11. The chipping knives 12 each have a threaded bore 18 for holding the shaft of the screw 13 in the areas assigned to the slots 14. The blade of a chipping knife is labeled as 19. The slots 14 make it possible for the knife holding plate 11 and the chipping knife 12 to slide relative to one another in the direction of the slots 14, before they are screwed together. In this way, the width of a knife assembly 2 can be adjusted transversely to its longitudinal direction.

By fastening a knife assembly 2 in this way, the concrete, actual position of the blade 19 within the knife ring 1 arises from the position of the mounting surface 6 and of the stop 8 within the knife ring 1, as well as from the relative position of the knife holding plate 11 and the chipping knife 12 to one another, in other words, from the degree of overlap of the knife holding plate 11 and the chipping knife 12 transversely to their longitudinal direction.

To adhere to an optimal chip quality, the knife projection should be of crucial importance. The knife projection corresponds to the radial projection 20 of the blade 19 over the inside 7 of the knife ring 1. From FIG. 1, one can see that deviations from the target thickness of the knife assembly 2 directly affect the radial position of the blade 19. If a knife assembly 2 is thicker than predetermined, the knife projection is decreased and thus also the chip thickness. If the actual thickness of a knife assembly 2, however, is smaller, then the knife projection and therefore the chip thickness will increase.

A device according to the invention 21 serves to adjust the exact knife projection such as it is shown in FIGS. 2 to 8. The device 21 has a carrier frame 22 for a flat mounting plate 23. For this purpose, the carrier frame 22 features two side elements 24 situated opposite one another at a distance, with offset base regions that are rigidly connected to one another via rods 25. The mounting plate 23 also rigidly adjoins the upper edges of the side elements 24, whereby a flat contact area is provided for a knife assembly 2 that is to be adjusted. The blade 19 of a knife assembly 2 is hereby assigned to the front longitudinal edge 26 of the mounting plate 23, and the rear longitudinal side of the knife holding plate 11 opposite the blade 19 is assigned to the rear longitudinal edge 27. The same is true for the left transverse edge 28 and the right transverse edge 29 of the mounting plate 23.

To create mounting surfaces for further functional components, in each case a flat projection 30 is provided in the mounting plate 23 plane, in the two end regions of the rear longitudinal edges 27, on which in each case a first stop 31 is disposed with a stop surface which acts transversely to the longitudinal direction of the device 1. The first stop 31 interacts with a first adjusting element 32 in the form of a pneumatically operated cylinder/piston unit with a movable piston 33, coupled with a knife holding plate 11, preferably by engaging in the recess 16 of a slot 14. By inserting the piston 33 into the first adjusting element 32, the knife holding plate 11 can be biased with its rear longitudinal side against the first stop 31.

In the area of the front longitudinal edge 27 and at a clear distance to the transverse edges 28, 29, preferably at the positions at which the knife assembly also adjoins the knife carrier, in each case a measuring device 34 is disposed with housings 35 that are fixedly connected to the mounting plate 23 by means of a bracket 49. As shown in particular in FIG. 8, the measuring device 34 has a measuring ram 36 which is disposed linearly displaceable in the housing 35, with a free end forming a stop surface 37 for the blade 19 of the chipping knife 12. The displacement direction 51 of the measuring ram 36 forms an angle of 90° with the upper side of the mounting plate 23, or with the upper or lower side of the chipping knife 12. The stop surface 37 lies in a plane marked as 52 which runs perpendicular to the displacement direction 51. The measuring device 34 measures the displacement path of the stop surface 37 using the movement of the measuring ram 36 and displays it in a display 50. The measured displacement path hereby corresponds to the current knife projection of the knife assembly 2.

In order to be able to slide the chipping knife against the stop surface 37 with its blade 19 at the predetermined dimension and relative to the knife holding plate 11, a second adjusting element 38 is in each case fixedly mounted at the rear longitudinal edge 27 of the mounting plate 23 in the area of the lateral projections 30. The second adjusting element 38 has a spindle drive with coarse drive and fine drive and acts on the rear longitudinal side of the chipping knife 12 with its spindle rod 39. The chipping knife 12 can thus be moved in its plane against the displaceable stop surface 37 by means of the two, second adjusting elements 38.

In addition, a third stop 39 is provided at the left transverse edge 28 of the mounting plate 23 which interacts with a third adjusting element 40 in the area of the right transverse edge 29 of the mounting plate 23. Upon activation, the third adjusting element 40 presses on the front end of the knife holding plate 11 facing the element. The front end is thus moved against the third stop 39 with its opposing front end.

Accordingly, a fourth stop 41 is arranged at the right transverse edge 29 which interacts with a fourth adjusting element 42 in the area of the left transverse edge 28 of the mounting plate 23. By means of the fourth adjusting element 42 which acts on the front end of the chipping knife 12 facing the element, the chipping knife 12 is chipped at the fourth stop 41.

Finally, the flat projections 30 also serve to hold two clamping elements 43 with swivel-mounted clamping levers 44 that can be lowered to the chipping knife 12 and in this way clamp together the chipping knife 12 and the knife holding plate 11 to secure them in their mutual positions.

Hereinafter, the inventive method is described for adjusting a knife assembly 2 to a predetermined knife projection outside of a knife ring 1 in an inventive device 21. First, the knife holding plate 11 is placed onto the mounting plate 23 of an inventive device 21 with its upper surface 15 facing downwards, wherein the rear longitudinal side of the knife holding plate 11 points toward the rear longitudinal edge 27 of the mounting plate 23, and the displaceable piston 33 of the first adjusting elements 32 each engage in the recesses 16 in the knife holding plate 11.

A chipping knife 12 is then placed on its spine on a knife holding plate 11, wherein the blade 19 of the chipping knife 12 is fitted to the front longitudinal edge 26 of the mounting plate 23. The two second adjusting devices 38 in the area of the lateral projections 30 are thereby aligned with the rear longitudinal side of the chipping knife 12.

Figure 4:
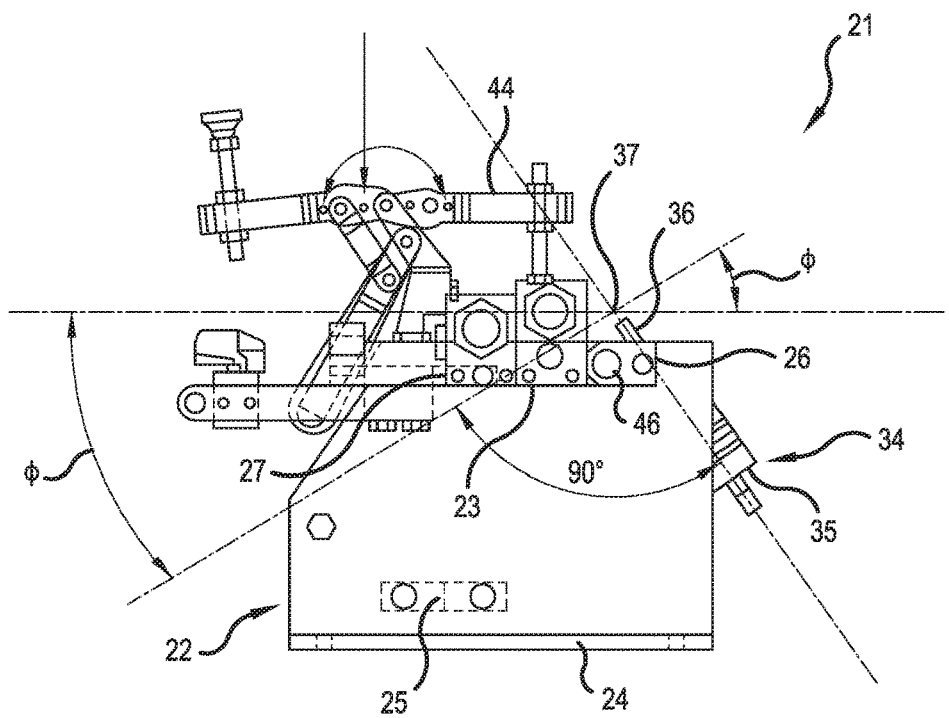
FIG. 4 is a cross view of the device, shown in FIGS. 2 and 3.

To prevent undesirable lifting of the chipping knife 12 and/or the knife holding plate 11 from the mounting plate 23, in a next step, the clamping elements 43 are activated, with the clamping levers 44 pressing against the chipping knife 12 without, however, impeding the relative motion between the knife holding plate 11 and the chipping knife 12 in the shared contact plane. This state is shown in FIG. 4.

Figure 5:
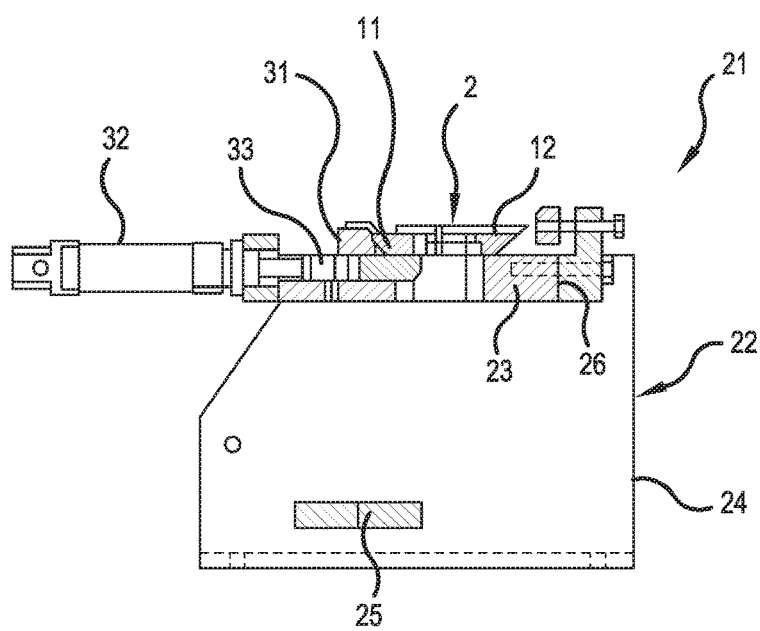
FIG. 5 is a cross-section through the device along the line V-V, shown in FIG. 3.

As shown in FIG. 5, the moveable pistons 33 of the first adjusting elements 32 are retracted with subsequent activation, wherein the knife holding plate 11 is moved against the first stops 31 with its rear longitudinal side.

Hereinafter, the third adjusting element 40 and the fourth adjusting element 42 can be activated, whereby the chipping knife 12 is moved against the third stop 39 in its longitudinal direction, and the knife holding plate 11 is moved against the fourth stop 41 in the opposite direction. This way, it can be ensured that the end of all chipping knives 12 of a knife ring 1 are situated in a shared vertical plane, relative to the rotational axis.

Subsequently, both second adjusting elements 38 are activated, which press, relative to the rear longitudinal side of the chipping knife 12, with the free end of their spindle rods 45 and bring the blade 19 of the chipping knife 12 into the region of the measuring device 34. There, the blade 19 ultimately comes into contact with the stop surface 37 of the measuring device 34. During ongoing readjustment of the chipping knives 12, the stop surface 37 linearly yields to the plane of the chipping knife 12 at a chip angle $\phi+90°$. The path that the stop surface 37 covers is thereby measured by a path measuring system and is displayed by the display 50. The value shown thereby corresponds to the actual knife projection of the knife assembly 2, independent of the actual thickness of the knife holding plate 11. This state is shown in FIG. 6.

After the chipping knife 12 has assumed its targeted position against the knife holding plate 11 and the knife assembly 2 has thus been adjusted to the desired knife projection, the knife holding plate 11 and chipping knife 12 are temporarily clamped together in this relative position by means of the clamping elements 43.

Figure 6:
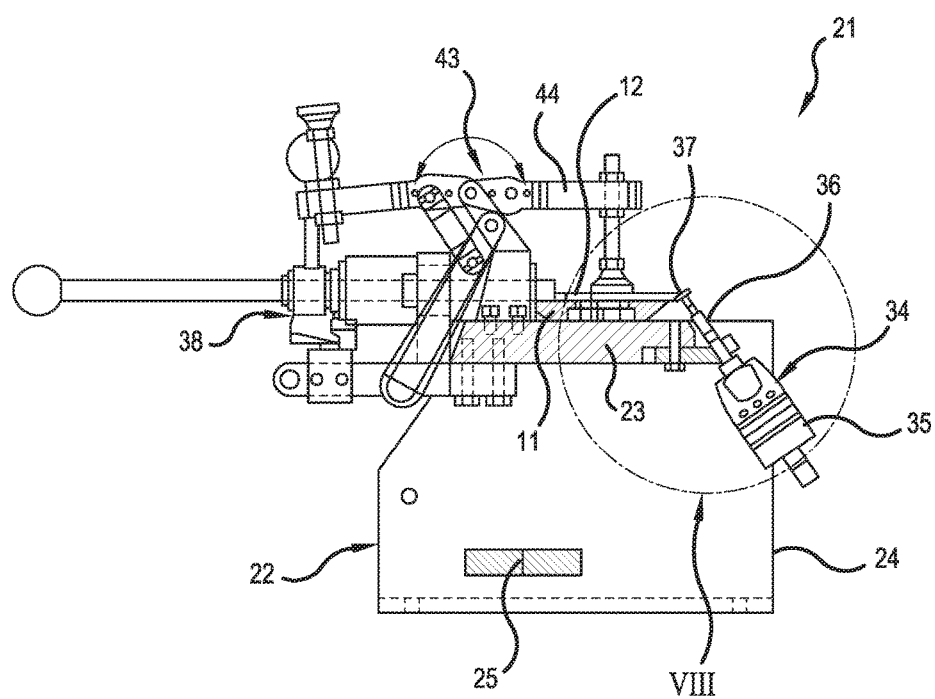
FIG. 6 is a cross-section through the device along the line VI-VI, shown in FIG. 3.
Figure 7:
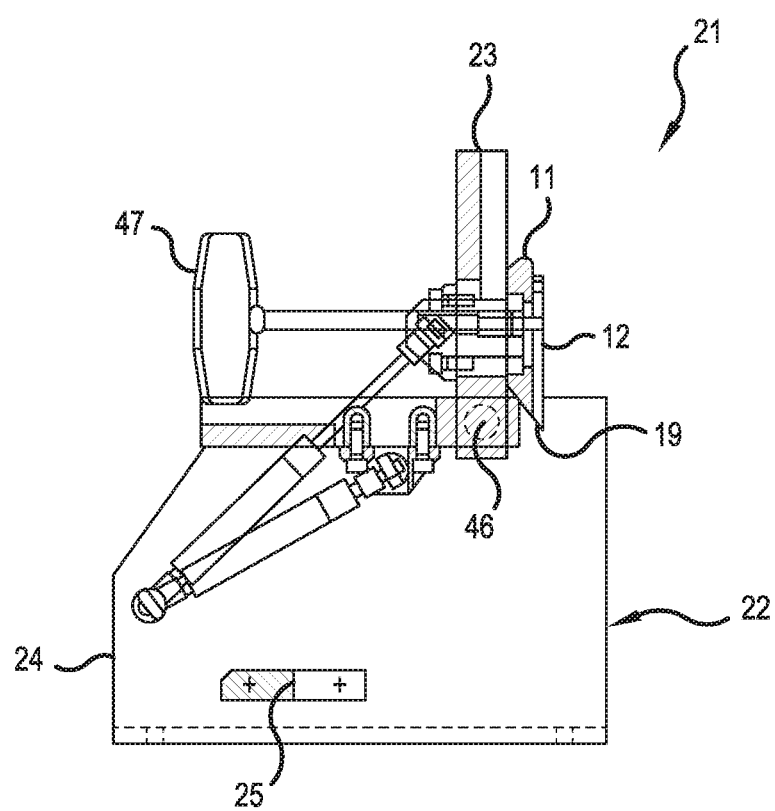
FIG. 7 is a cross-section through the device along the line VII-VII, shown in FIG. 3.
Figure 8:
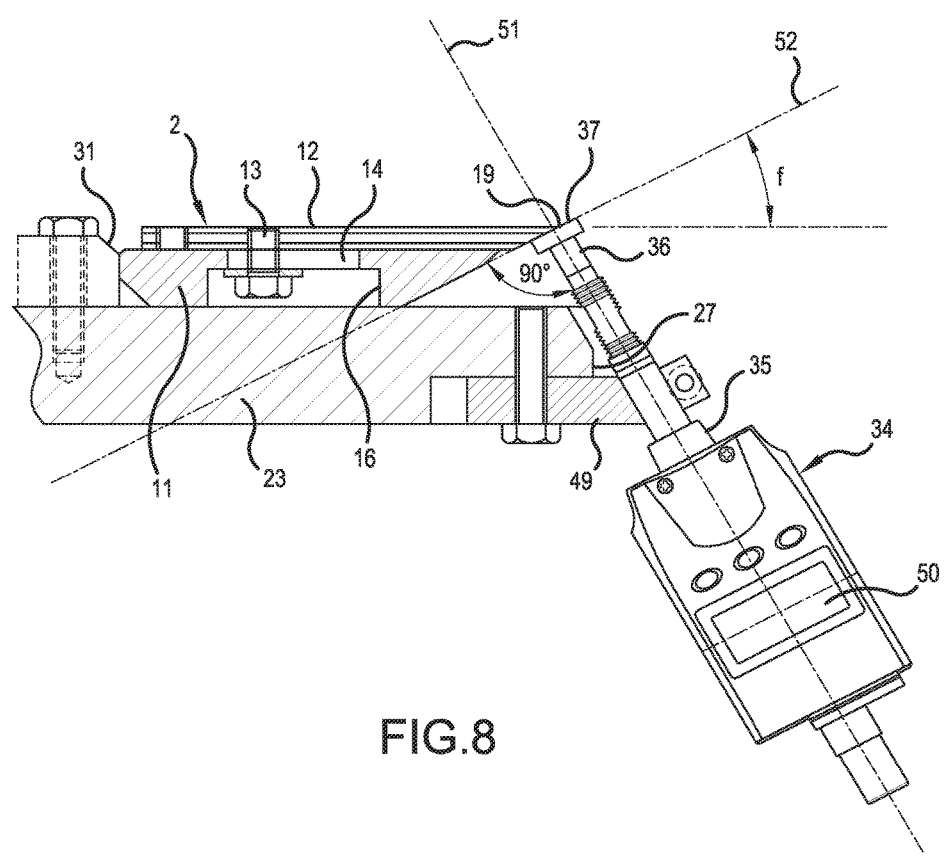
FIG. 8 illustrates a detail of the area in FIG. 6, labeled as VIII.

As shown in FIG. 6, the mounting plate 23 with the clamped knife assembly 2 is then brought upwards and around the swivel bearings 46, into an upright position with its rear longitudinal edge 27. In this upright position, the underside 17 of the mounting plate 23 is easily accessible for attaching a clamping tool 47. Using the clamping tool 47, the knife holding plate 11 and the chipping knife 12 are then permanently screwed together with the screws 13.

After disengaging the two clamping elements 43 and resetting the adjusting elements 32, 38, 40, 42, a knife assembly 2 of the inventive device 21 which is adjusted to the required knife projection can be retrieved and is prepared for use in a knife ring 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for adjusting a knife assembly to a predetermined knife projection, the knife assembly being intended to be arranged in a knife ring at a chip angle relative to an inside of the knife ring, and wherein the knife assembly includes a knife holding plate and a chipping knife that are positively connected with each other in a predetermined, relative target position, the method comprising:

providing the knife assembly to be adjusted, wherein the knife holding plate and the chipping knife of the knife assembly are displaceable relative to one another and wherein each of the knife holding plate and the chipping knife have a front longitudinal edge, a rear longitudinal edge, a left transverse edge and a right transverse edge;

using a first adjusting element to displace the knife holding plate along a plane of the knife holding plate in a direction transverse to a longitudinal direction of the knife holding plate so that the rear longitudinal edge of the knife holding plate is pushed against a first stop;

using a second adjusting element to displace the chipping knife along a plane of the chipping knife in a direction transverse to a longitudinal direction of the chipping knife such that a blade provided along the front longitudinal edge of the chipping knife is pushed against a stop surface of a second stop until a predetermined knife projection has been reached, the predetermined knife projection being a distance that the blade of the chipping knife projects beyond the front longitudinal edge of the knife holding plate, wherein the stop surface of the second stop forms an angle with the chipping knife which corresponds to the chip angle; and force-fitted clamping of the chipping knife and the knife holding plate, wherein the stop surface of the second stop is part of a measuring device for measuring a knife projection of the chipping knife relative to the front longitudinal edge of the knife holding plate, the knife projection changing as the chipping knife displaces, such that the measuring device determines when the predetermined knife projection has been reached, wherein the stop surface of the second stop is moveably disposed, substantially perpendicular to a plane of the stop surface of the second stop, such that when adjusting the knife projection, the blade of the chipping knife is moved substantially perpendicular to the stop surface of the second stop until the predetermined knife projection has been reached, and wherein the knife projection is derived from a degree of movement of the stop surface of the second stop.

2. The method according to claim 1, wherein the chipping knife rests at an underside of the knife holding plate.

3. The method according to claim 1, wherein the knife holding plate and chipping knife are clamped together while applying a clamping force, which allows for relative movement transversely to the shared contact plane.

4. The method according to claim 1, wherein the knife holding plate is displaced by a third adjusting element in the longitudinal direction of the knife holding plate so that the left transverse edge of the knife holding plate is pushed against a third stop, and the chipping knife is displaced by a fourth adjusting element in the longitudinal direction of the chipping knife so that the right transverse edge of the chipping knife is pushed against a fourth stop.

5. The method according to claim 1, wherein the knife assembly is rotated or turned prior to being force-fitted.

6. A device for adjusting a knife assembly to a predetermined knife projection, the knife assembly including a knife holding plate and a chipping knife that are displaceable relative to one another, the device comprising:
a mounting plate, on which the knife assembly is placed, for the knife assembly to be adjusted;
a first stop acting transversely to the longitudinal direction of the knife holding plate, such that the first stop interacts with a rear longitudinal edge of the knife holding plate;
a second stop acting transversely to the longitudinal direction of the chipping knife and interacting with a blade provided along a front longitudinal edge of the chipping knife, the second stop having a stop surface at which the blade of the chipping knife adjoins when adjusting the knife projection, the stop surface forming an angle with the chipping knife that corresponds to a chip angle; and
a measuring device that measures a knife projection of the chipping knife relative to a front longitudinal edge of the knife holding plate, the stop surface being part of the measuring device and the stop surface being displaceably disposed, wherein the measurement is based on a displacement path of the stop surface.

7. The device according to claim 6, wherein the stop surface is displaceably disposed substantially perpendicular to a plane of the stop surface.

8. The device according to claim 6, wherein the measuring device has a linearly moveable measuring ram and the stop surface is formed by the front end of the measuring ram.

9. The device according to claim 6, wherein the stop surface is spring-loaded.

10. The device according to claim 6, wherein the device has a first adjusting element that moves the knife holding plate transversely to the longitudinal direction of the knife holding plate against the first stop.

11. The device according to claim 10, wherein the device has a second adjusting element that moves the chipping knife transversely to the longitudinal direction of the chipping knife against the stop surface of the second stop.

12. The device according to claim 11, further comprising a third stop acting in the longitudinal direction of the knife holding plate, wherein the device has a third adjusting element that moves the knife holding plate in the longitudinal direction of the knife holding plate against the third stop.

13. The device according to claim 12, further comprising a fourth stop acting in the longitudinal direction of the chipping knife, wherein the device has a fourth adjusting element that moves the chipping knife in the longitudinal direction of the chipping knife against the fourth stop.

14. The device according to claim 6, wherein the mounting plate is disposed on at least one swivel bearing in the area of a front longitudinal edge of the mounting plate and is rotatable upwards or downwards.

15. The device according to claim 6, wherein the mounting plate has a front longitudinal edge, a rear longitudinal edge, a left transverse edge and a right transverse edge, wherein a first adjusting element and a second adjusting element are each arranged along the rear longitudinal edge of the mounting plate, wherein a third adjusting element is arranged along the right transverse edge of the mounting plate and a fourth adjusting element is arranged along the left transverse edge of the mounting plate.

* * * * *